United States Patent
Arora et al.

(10) Patent No.: US 12,438,941 B1
(45) Date of Patent: Oct. 7, 2025

(54) DATA DISTRIBUTION SERVICE

(71) Applicant: Confluent, Inc., Mountain View, CA (US)

(72) Inventors: Abhishek Arora, Mountain View, CA (US); Arjun Satish, Los Gatos, CA (US); Jonathan Paul Rosenberg, Redmond, WA (US); Arjun Mukherji, San Jose, CA (US); Yuanchao Yu, Shawnee, KS (US)

(73) Assignee: Confluent, Inc., Mountain View, CA (US)

( * ) Notice: Subject to any disclaimer, the term of this patent is extended or adjusted under 35 U.S.C. 154(b) by 0 days.

(21) Appl. No.: 19/096,591

(22) Filed: Mar. 31, 2025

(51) Int. Cl.
*H04L 67/1095* (2022.01)
*H04L 41/0894* (2022.01)

(52) U.S. Cl.
CPC ...... *H04L 67/1095* (2013.01); *H04L 41/0894* (2022.05)

(58) Field of Classification Search
None
See application file for complete search history.

(56) References Cited

U.S. PATENT DOCUMENTS

| | | | |
|---|---|---|---|
| 7,313,614 B2 * | 12/2007 | Considine | H04L 67/1097 711/155 |
| 2015/0124622 A1 * | 5/2015 | Kovvali | H04L 45/38 370/236 |
| 2019/0253319 A1 * | 8/2019 | Kampanakis | G06N 5/025 |

OTHER PUBLICATIONS

Susarla et al., "Flexible Consistency for Wide Area Peer Replication", Jan. 1, 2005, IEEE, 25th IEEE International Conference on Distributed Computing Systems (ICDCS'05) (2005, pp. 199-208) (Year: 2005).*

* cited by examiner

*Primary Examiner* — Davoud A Zand
(74) *Attorney, Agent, or Firm* — Schwegman Lundberg & Woessner, P.A.

(57) ABSTRACT

A cross-region data distribution service enables eventually consistent replication of data objects between geographical regions while maintaining data ordering guarantees. For data replication between two regions, the system leverages a data stream-based replication model where destination region leverages a watch API exposed by origin regions. The origin region watch API provides a resumable data stream for changes happening in the origin region that need to be replicated to destination. The system exposes distribution ability through distribution policies which are global objects that encode the source datasets and desired distribution topology. In order to solve data fanout scalability challenges where same data needs to be replicated to many regions, system leverages caching at origin watch servers. The system maintains data ordering by enforcing ordered replication stream provided by watch servers and using version based conditional optimistic concurrency control writes in destination servers.

20 Claims, 10 Drawing Sheets

300

310 — DISTRIBUTION TABLE

| RESOURCE | SOURCE | DESTINATION |
|---|---|---|
| FLINK TASK MANAGER 1 | PC-123 | PC-456 |
| FLINK TASK MANAGER 1 | PC-123 | PC-789 |
| TENANT-A DATA | R-234 | R-567 |
| TENANT-B DATA | R-567 | R-234 |

320 — header row
330A, 330B, 330C, 330D — data rows

*FIG. 3*

DATA DISTRIBUTION SERVICE

TECHNICAL FIELD

The subject matter disclosed herein generally relates to a data distribution service. Specifically, the present disclosure addresses systems and methods for a data distribution service suitable for distributing data across cloud service providers (CSPs) and regions.

BACKGROUND

Cloud computing systems often involve deploying resources and services across multiple geographic regions and CSPs to improve availability and reduce latency for end users. In distributed cloud environments, applications and services frequently need to access data that may be stored in different regions or cloud providers. Traditional approaches involve making cross-region reads on demand when data is needed, but this can lead to high latency due to the need to make calls over the internet between regions.

When aggregating or searching data across multiple regions, applications typically need to fan out requests to each region individually and then combine the results. This approach faces challenges with varying latency between regions and potential availability issues if any single region is experiencing problems.

BRIEF DESCRIPTION OF THE DRAWINGS

Some embodiments are illustrated by way of example and not limitation in the figures of the accompanying drawings.

FIG. 3 is a diagram of a database schema suitable for use by a data distribution service, according to some example embodiments.

DETAILED DESCRIPTION

Figure 1:
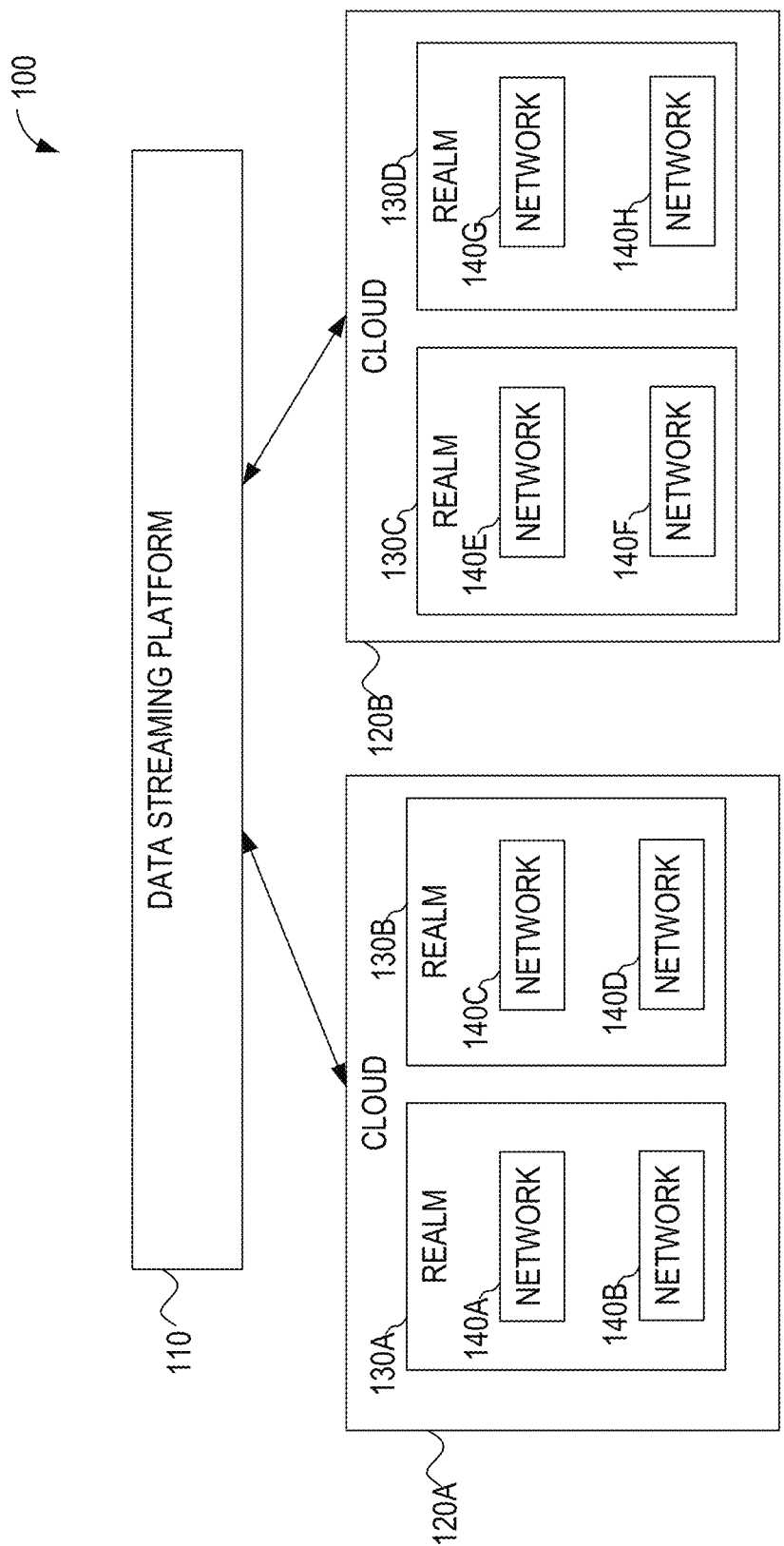
FIG. 1 is a diagram illustrating relationships among a data streaming platform, cloud service providers, realms, and networks, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The cloud comprises a network of servers that are accessible over the Internet and the software and databases that run on those servers. When a resource is being deployed to the cloud, there are many possible locations for the deployment. For example, an application is executed by processors and memory in a physical cluster. The physical cluster may handle many tasks, which may be divided into logical clusters. The physical cluster is one of several physical clusters that are managed by a management system such as Kubernetes™, Nomad™, or Elastic Container Service™ (ECS). The management system executes within a network, such as a US network, a European network, or an Asian network of a cloud provider, such as Amazon Web Services™ (AWS), Microsoft Azure™, or Google Cloud Platform™. A customer of the cloud provider may use multiple accounts, referred to as realms, each of which may access one or more networks of the cloud provider.

As used herein, the generic term for a realm, network, management system, physical cluster, logical cluster, or application is "asset." When an asset is created, it is placed under a parent asset. Some assets have a dedicated placement that specifies a particular parent asset. Other assets are shared, and placement of the asset is performed based on information about the asset to be placed and the available parent assets.

A cross-region data distribution service that enables eventually consistent replication of data objects (or "resources") between different geographical regions while maintaining data ordering and consistency guarantees is described herein. The system, in some example embodiments, leverages a watch-based application programming interface (API) architecture to implement efficient cross-region distribution, where destination regions pull data from source regions through persistent Transmission Control Protocol (TCP) connections secured by mutual Transport Layer Security (TLS) authentication.

In some example embodiments, the system implements a policy-based distribution control mechanism. Distribution policies are stored as global objects that specify source regions, source datasets, and destination regions, allowing fine-grained control over what data gets replicated where. The policies support sophisticated filtering criteria and can dynamically adapt to handle new regions being added or removed from the distribution topology.

To optimize network utilization and reduce cross-region bandwidth costs, the system may implement subscription multiplexing over remote procedure call (e.g., gRPC) streams. Rather than creating separate streams for each watch session, multiple subscriptions can share the same stream while maintaining isolation. This multiplexing enables efficient batching and compression of data across subscriptions.

The system may provide built-in fault tolerance through a sophisticated session management system. Session state may be maintained using continuation tokens that allow sessions to be resumed after interruptions.

A bootstrap distribution mechanism for system metadata may be employed. The service may implement a hardcoded policy for distributing critical configuration data like distribution policies themselves, avoiding circular dependencies while ensuring all regions maintain consistent views of the system's configuration.

A meta-distribution service layer that adds tenant and tenant namespace awareness on top of the core distribution engine may be included. This allows for intelligent routing of data based on higher-level constructs while maintaining a clean separation from an underlying storage layer that provides storage level distribution APIs that identify datasets and associated distribution topologies.

To ensure data consistency, the system can enforce a strict producer/consumer model where objects can only be mutated in their home region, with distributed copies being read-only. In some example embodiments, a consumer in a destination region provides an identifier of an origin region to a read API.

To prevent conflicts, object identifiers may be managed across regions. Objects may be versioned such that any mutation to an object increases its version by one. Conflicts may occur during restarts where a newer version of data is already present in a destination and, when processing resumes, the producer provides an older version. This type of conflict may be handled using optimistic concurrency control on object version. Thus, if the version of the object being replicated is older that the version of the object at the destination, the object is not replaced in the destination store. Another type of conflict is a naming conflict for resources across regions. This type of conflict may be handled by writing data to destinations using a namespace for the origin region, thus distinguishing between two objects having the same name but originating in different regions.

Observability may be enhanced using built-in monitoring of distribution sessions, latency tracking, detection of event losses or ordering issues, or any suitable combination thereof. As a result, operators may be enabled to maintain visibility into the health and performance of cross-region distribution at scale.

To enhance security, multiple layers of protection may be used, such as mutual TLS authentication, Internet Protocol (IP) filtering, policy-based access controls, or any suitable combination thereof. The system may be integrated with service-to-service authentication systems while supporting a migration path from self-signed certificates to production security infrastructure.

The architecture may employ a hierarchical fanout design to achieve scalability, using a single Kafka consumer per data kind on each watch server that writes to an in-memory ring buffer or local key-value store. This allows the system to efficiently support hundreds of thousands of watch sessions per region, dramatically improving upon previous limitations. In some example embodiments, the reading from state and stream stores (e.g., CSP database or Kafka) is performed once per origin watch server. Each origin watch server maintains a cache of state in database and stream state. The cache may be maintained in Kafka, in a ring buffer, a local key-value store, a scalable external store, or any suitable combination thereof. The cache storage may be optimized for higher fanout throughput to overcome scale challenges of CSP DB and Kafka when the same changes have to be delivered to a high number of watch sessions, initiated by destination regions, that replicate data.

FIG. 1 is a diagram 100 illustrating relationships among a data streaming platform 110; cloud service providers 120A and 120B; realms 130A, 130B, 130C, and 130D; and networks 140A, 140B, 140C, 140D, 140E, 140F, 140G, and 140H, according to some example embodiments. The various elements of FIG. 1 may be referenced by number alone. For example, "a cloud service provider 120" may be used to refer generically to either of the cloud service providers 120A-120B and "the cloud service providers 120" may be used to refer to the cloud service providers 120A-120B collectively. Similarly, "a realm 130" may be used to refer generically to any of the realms 130A-130D and "the realms 130" may be used to refer to the realms 130A-130D collectively. Likewise, "a network 140" may be used to refer generically to any of the networks 140A-140H and "the networks 140" may be used to refer to the networks 140A-140H collectively.

The data streaming platform 110 provides services using applications running on hardware computing resources of one or more cloud service providers 120. To access the cloud service providers 120, the data streaming platform 110 may use multiple accounts, each account having different access credentials (e.g., username and password). The realms 130 represent these separate methods of accessing the cloud service providers 120.

The cloud service provider 120 may provide access to multiple networks 140, such as a US network, a European network, and an Asian network. In addition to, or instead of, being divided by geography, networks may be divided by functionality. For example, the network 140A may provide access to artificial intelligence (AI) tools and the network 140B may not. After connecting to a cloud service provider 120 with an account, thus defining a realm 130, applications are deployed to hardware computing resources of a particular network 140.

Data generated in an asset may be available only in that asset. For example, data generated in a realm may be inaccessible to other realms. Alternatively, data generated in an asset may be accessed when needed by other assets, incurring a high latency as various networks are traversed, communications are encrypted and decrypted, users are authenticated, and the like. To allow cross-asset data access without incurring high latency, a data distribution service as described herein may be used.

Figure 2:
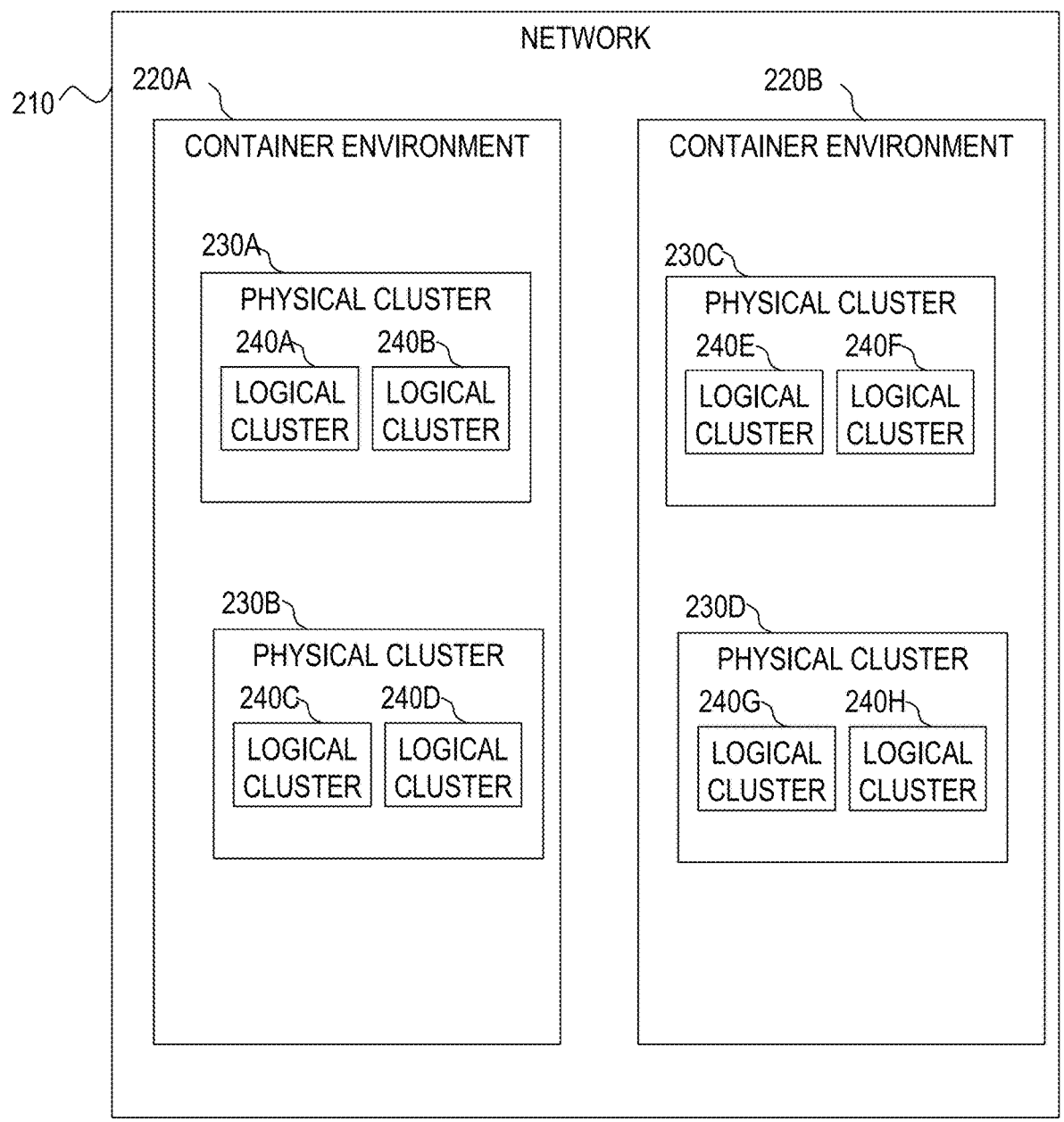
FIG. 2 is a diagram illustrating relationships among a network, container environments, physical clusters, and logical clusters, according to some example embodiments.

FIG. 2 is a diagram illustrating relationships among a network 210; container environments 220A and 220B; physical clusters 230A, 230B, 230C, and 230D; and logical clusters 240A, 240B, 240C, 240D, 240E, 240F, 240G, and 240H, according to some example embodiments. The various elements of FIG. 2 may be referenced by number alone. For example, "a logical cluster 240" may be used to refer generically to any of the logical clusters 240A-240H and "the logical clusters 240" may be used to refer to the logical clusters 240A-240H collectively.

The network 210 may include multiple container environments 220. For example, the container environments 220A may be separate Kubernetes clusters. The container environments 220 may each make use of multiple physical clusters 230. A physical cluster 230 comprises the actual physical computing hardware on which the application will run. The resources of a physical cluster 230 may be divided into multiple logical clusters 240. Thus, even though two containerized applications of the container environment 220A may execute on the same physical cluster 230A, they may execute in different logical clusters 240A, 240B.

FIG. 3 is a diagram of a database schema 300 suitable for use by a data distribution service, according to some example embodiments. The database schema 300 includes a distribution table 310.

The distribution table 310 includes rows 330A, 330B, 330C, and 330D of a format 320. By way of example, four rows 330A-330D are shown, but the distribution table 310 may include any number of rows, such as one row for each resource for each asset in the system. For example, a resource generated at one asset may be distributed to every other asset in the system or resources generated at many assets may be distributed to one asset. Thus, in a system with thousands of clusters, the distribution table 310 may include tens of thousands of rows, an amount of data far beyond the ability of a human mind to process.

As indicated by the format 320, each of the rows 330A-330D includes an identifier of a resource, a source of the resource, and a destination for the resource. Thus, the rows 330A and 330B show that the resource FLINK TASK MANAGER 1 is to be distributed from the physical cluster resource PC-123 to the physical cluster resources PC-456 and PC-789. The row 330C shows that the TENANT-A DATA resource is to be distributed from the realm R-234 to the realm R-567. The row 330D shows that the TENANT-B DATA resource is to be distributed from the realm R-567 to the realm R-234.

In various example embodiments, additional tables may be used or additional fields may be added to the distribution table 310. For example, a tenant-region mapping table may be used to map tenants to regions or realms. A distribution policy that identifies tenants to which data should be distributed can be converted to a region-based policy by accessing such a tenant table. This provides greater flexibility to the creators of the distribution policies.

The distribution policies may identify an object type to be distributed, one or more filters that further define which objects of the object type are to be distributed, a source resource from which objects of the object type are to be distributed, one or more destination resources to which objects of the object type are to be distributed, one or more source regions from which objects of the object type are to be distributed, or any suitable combination thereof. The filters may allow for granular filtering at the level of tenants, namespaces, object fields, or any suitable combination thereof.

Figure 4:
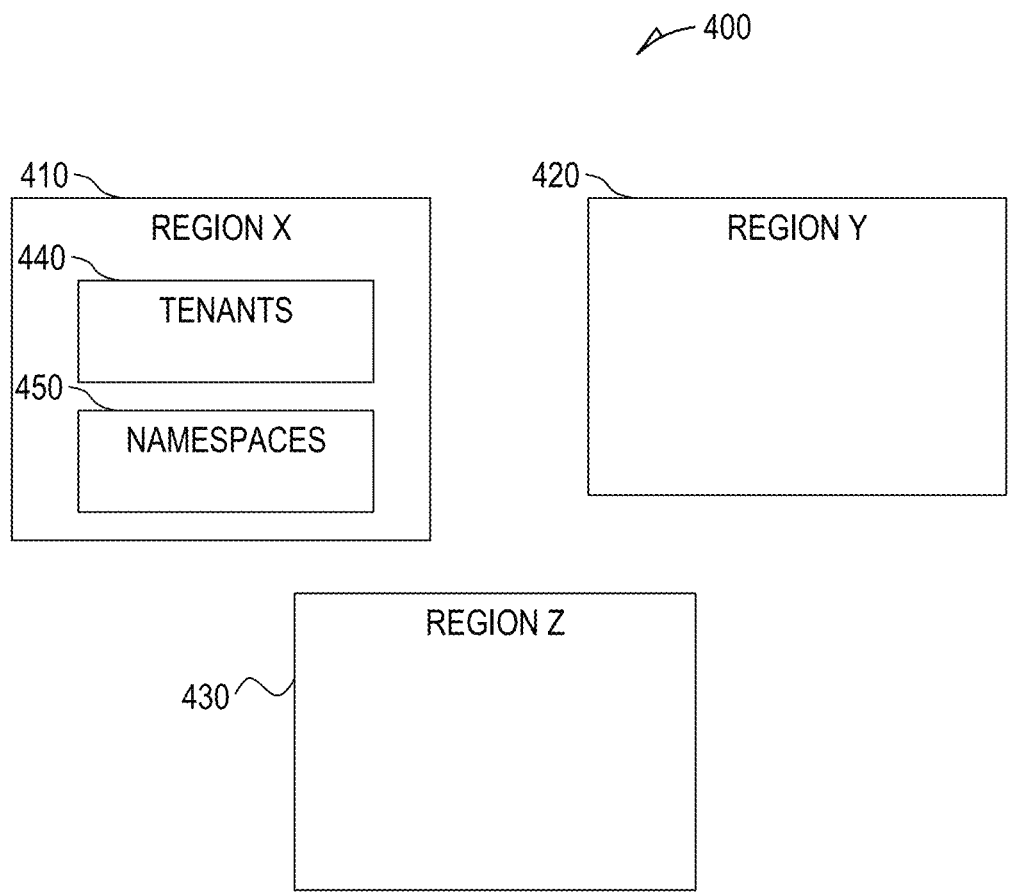
FIG. 4 is a diagram showing data in a region that is not shared to other regions, according to some example embodiments.

FIG. 4 is a diagram 400 showing data in a region 410 that is not shared to other regions 420 and 430, according to some example embodiments. The regions 410-430 may correspond to cloud service providers 120, realms 130, or networks 140 of FIG. 1. The region 410 stores data 440 for tenants and data 450 for tenant namespaces. The data 440 and the data 450 are not available to the regions 420 and 430. Any access of the data 440 or the data 450 from the regions 420 and 430 will involve requests for data transfer between regions, resulting in high latency.

Figure 5:
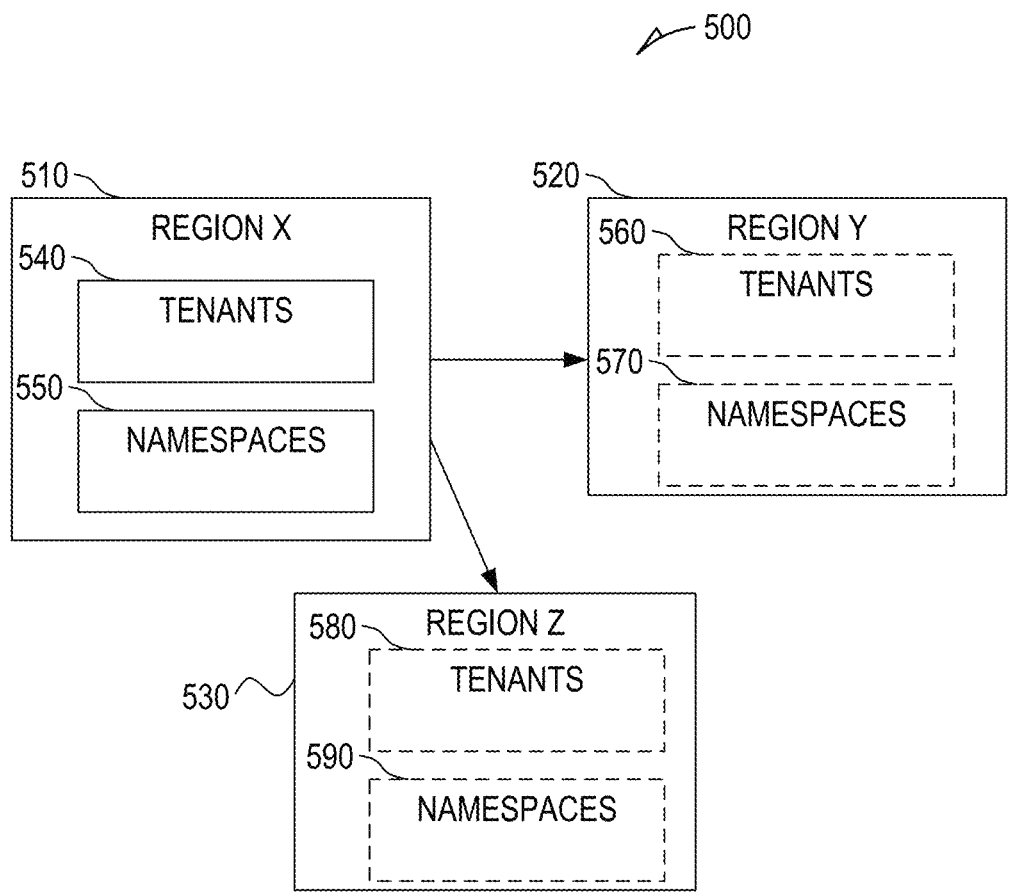
FIG. 5 is a diagram showing data in a region that is shared to other regions, according to some example embodiments.

FIG. 5 is a diagram 500 showing data in a region 510 that is shared to other regions 520 and 530, according to some example embodiments. The regions 510-530 may correspond to cloud service providers 120, realms 130, or networks 140 of FIG. 1. The region 510 stores data 540 for tenants and data 550 for tenant namespaces.

Using a data distribution service, the data 540 and the data 550 are distributed to the regions 520 and 530. As a result, a local copy of the data 540 is available in the region 520 as data 560 and in the region 530 as data 580. Likewise, a local copy of the data 550 is available in the region 520 as data 570 and in the region 530 as data 590. Accordingly, the local copies 560-590 of the data 540 and the data 550 may be accessed by the regions 520 and 530 without transferring, at the time of data access, data between regions. This results in lower latency and higher availability for remote data that is read in destination regions.

The data distribution service may implement multiple layers of security protections for cross-region data transfer. For example, the system may use mutual TLS (Transport Layer Security) authentication as the primary security mechanism for authenticating connections between regions.

In some example embodiments, the service uses self-signed certificates that are managed through Kubernetes cert-manager. Additional security measures include IP filtering for cross-region access, particularly when using ALB/ingress endpoints. The system may also implement policy-based access controls to govern data distribution permissions.

The security architecture ensures that data transfers occur over persistent TCP connections that are secured by the mutual TLS authentication, providing encryption and authentication for all cross-region communication. When integrated with service-to-service authentication systems, the security implementation supports a clear migration path from self-signed certificates to production security infrastructure while maintaining robust protection for distributed data.

Figure 6:
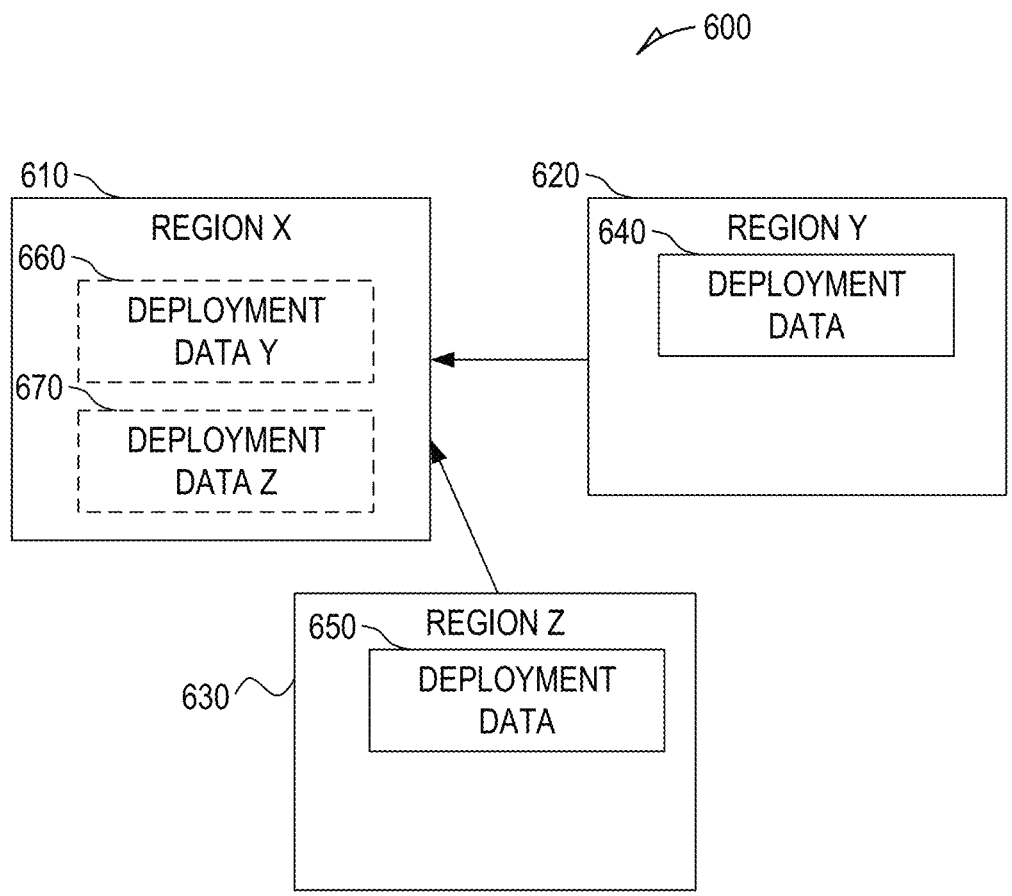
FIG. 6 is a diagram showing data in multiple regions that is shared to another region, according to some example embodiments.

FIG. 6 is a diagram 600 showing data in multiple regions 620 and 630 that is shared to another region 610, according to some example embodiments. The regions 610-630 may correspond to cloud service providers 120, realms 130, or networks 140 of FIG. 1. The region 620 stores data 640 for deployments in the region 620. The region 630 stores data 650 for deployments in the region 630.

Using a data distribution service, the data 640 and the data 650 are distributed to the region 610, thereby aggregating the data from all three of the regions 610-630 in the region 610. As a result, a local copy of the data 640 and the data 650 are available in the region 610 as data 660 and 670. Accordingly, the local copies 660-670 of the data 640-650 may be accessed by the region 610 without transferring, at the time of data access, data between regions.

Figure 7:
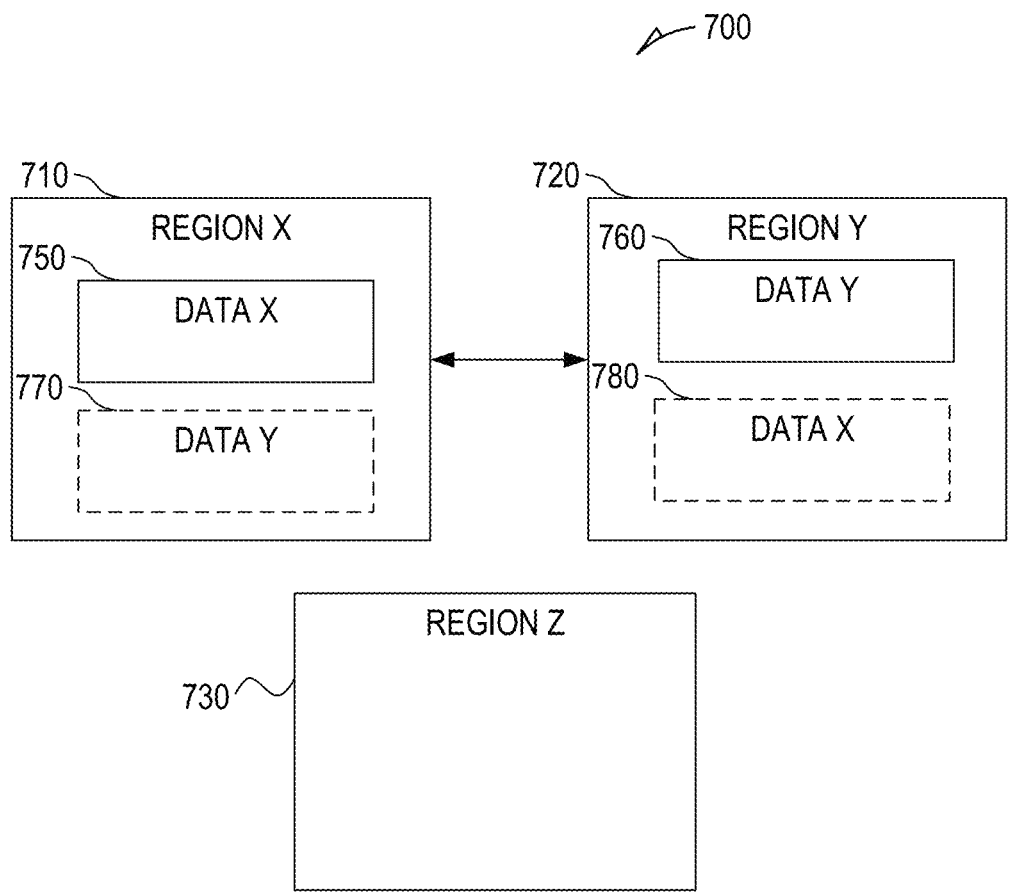
FIG. 7 is a diagram showing multiple regions that share data with each other, according to some example embodiments.

FIG. 7 is a diagram 700 showing multiple regions that share data with each other, according to some example embodiments. The regions 710-730 may correspond to cloud service providers 120, realms 130, or networks 140 of FIG. 1. The region 710 generates data 750. The region 720 generates data 760.

Using a data distribution service, the data 750 is distributed to the region 720 and the data 760 is distributed to the region 710. As a result, a local copy of the data 760 is available in the region 710 as the data 770. Likewise, a local copy of the data 750 is available in the region 720 as the data 780. Accordingly, both regions 710-720 are able to access data 750-760 generated in both regions without transferring, at the time of data access, data between regions.

Figure 8:
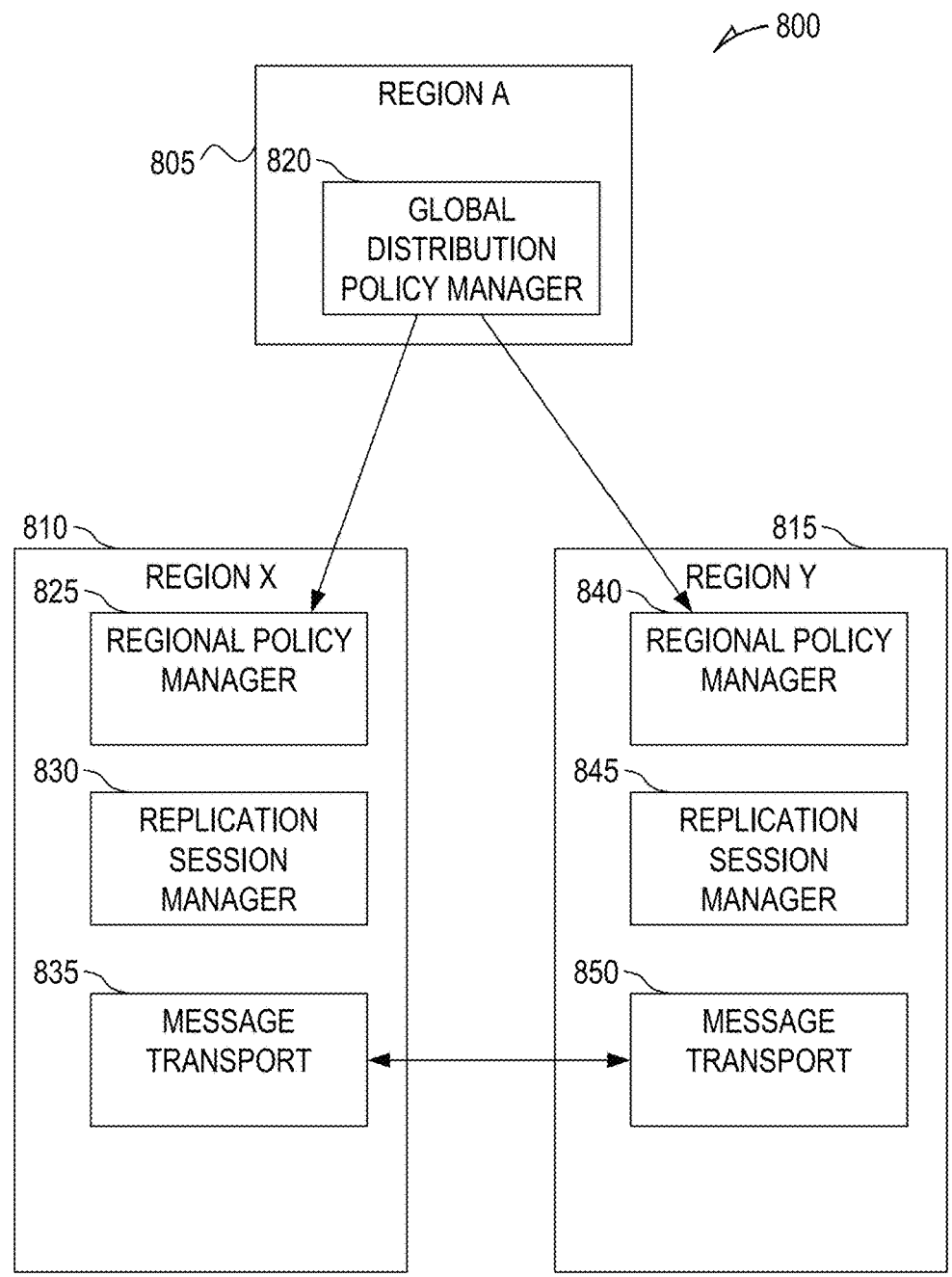
FIG. 8 is a diagram showing relationships between a global distribution policy manager and regional policy managers suitable for a data distribution service, according to some example embodiments.

FIG. 8 is a diagram 800 showing relationships between a global distribution policy manager 820 and regional policy managers 825 and 840 suitable for a data distribution service, according to some example embodiments. The regions 805-815 may correspond to cloud service providers 120, realms 130, or networks 140 of FIG. 1. By way of example, the region 810 corresponds to the realm R-234 and the region 815 corresponds to the realm R-567, both referenced in the distribution table 310 of FIG. 3.

The region 805 includes a global distribution policy manager 820. The global distribution policy manager 820 may access the distribution table 310 of FIG. 3 and send distribution policy data to the regional policy managers 825 and 840. The regional policy manager 825 determines which distribution policies involve data that is transferred to the region 810. The regional policy manager 840 determines which distribution policies involve data that is transferred to the region 815. In some example embodiments, other distribution polices are ignored by the respective regional policy managers.

Based on the data distribution policies that involve data being transferred to the region of the regional policy manager, a replication session manager 830 or 845 initiates replication sessions to request data. According to the rows 330C-330D of the distribution table 310, the realm R-567 is to request TENANT-A DATA from the realm R-234 and the realm R-234 is to request TENANT-B DATA from the realm R-567. As a result, the replication session managers 830 and 845 initiate message transports 835 and 850 to communicate the indicated data.

Once replicated, the data is available for local access in regions 810-815. The communication of the data may be repeated at regular intervals (e.g., every five minutes, every hour, or every day), occur in response to modification of data, or any suitable combination thereof. For example, an open communication channel may be maintained between source and destination regions. When data is changed at a source region, a message may be sent from the source region to the destination region to indicate that a change has occurred. In response, the destination region may send a request for updated data to the source region.

The replication session manager 830 maintains last consumed checkpoint information for a replication stream received by the region 810 and resumes replication from a last checkpoint after a region failure. Checkpoints may be periodically generated (e.g., every 10 minutes) or generated in response to events (e.g., transfer of replicated data from operating memory to disk storage).

Figure 9:
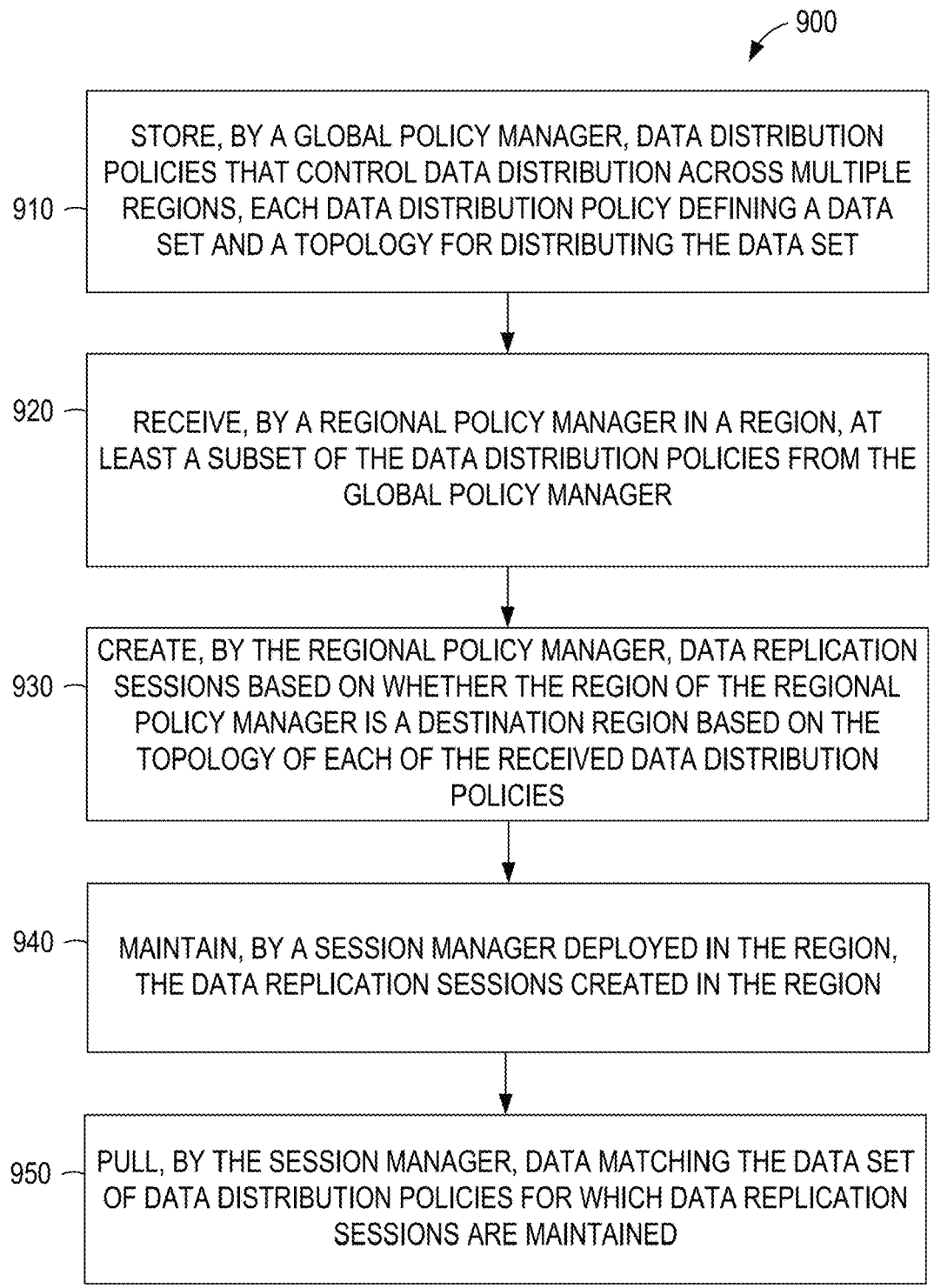
FIG. 9 is a flowchart illustrating operations of a method for distributing data, according to some example embodiments.

FIG. 9 is a flowchart illustrating operations of a method 900 for distributing data, according to some example embodiments. The method 900 includes operations 910, 920, 930, 940, and 950. By way of example and not limitation, the method 900 is described as being performed by the global distribution policy manager 820, the regional policy manager 825, and the replication session manager 830, all of FIG. 8.

In operation 910, the global distribution policy manager 820 stores data distribution policies that control data distribution across multiple regions. Each of the data distribution policies defines a data set and a topology for distributing the data set. For example, the global distribution policy manager 820 may store the distribution table 310 of FIG. 3. The set of rows for a single resource defines a data distribution policy. Thus, the rows 330A-330B together define a topology for distribution of the FLINK TASK MANAGER 1 data set. The topology has a single source, PC-123, and distributes data to PC-456 and PC-789.

The data distribution policy may use a data object or file in the format shown below. The example data distribution policy includes values for kind, hierarchy, origin regions, and destination regions. The kind and hierarchy values define the data set. For example, the kind may be a data type such as "schema" to indicate a Kafka topic schema. The hierarchy may define an object hierarchy scope. In the example below, namespace data from the namespace tenant-namespace-xyz is distributed for the tenant tenant-123. Together, the kind and the hierarchy define filtering criteria that select from all available data.

The origin regions and destination regions, together, define a topology for distribution. The data is distributed from the origin regions to the destination regions.

```
{
  kind: "schema",
  hierarchy: "tenant-123/tenant-namespace-xyz",
  origin_regions: ["aws-us-east-1"],
  destination_regions: ["aws-us-west-2", "azure-us-central-1"]
}
```

In the example above, the topology for distribution is a one-to-many topology where data is distributed from one origin region to multiple destination regions. In other example embodiments, the topology comprises a many-to-one topology where data is distributed from multiple origin regions to one destination region or a mesh topology where data is distributed from multiple origin regions to multiple destination regions.

The regional policy manager 825 in the region 810 receives at least a subset of the data distribution policies from the global distribution policy manager 820 (operation 920). In some example embodiments, the global distribution policy manager 820 publishes all of the data distribution policies to all regional policy managers. In other example embodiments, the global distribution policy manager 820 publishes a subset of the data distribution policies to each regional policy manager. For example, the regional policy manager 825 may receive only data distribution policies that send data to the region 810, may receive only data distribution policies that send data from the region 810, or may receive only data distribution policies that involve the region 810 either sending or receiving data.

In operation 930, the regional policy manager 825 creates data replication sessions based on whether the region 810 of the regional policy manager 825 is a destination region based on the topology of each of the received data distribution policies. The created data replication sessions replicate data from source regions to the region 810 of the regional policy manager 825.

The data distribution policies may comprise product-level policies that specify distribution for a tenant. Accordingly, the creating of the data replication sessions based on whether the region of the regional policy manager 825 is a destination region may include determining whether the tenant is present in the region of the regional policy manager.

The replication session manager 830 deployed in the region 810 maintains the data replication sessions created in the region (operation 940). Each data replication session involves sending data from an origin region to a destination region. Maintaining a data replication session may include periodically sending messages to the source to indicate that the data replication session is active (e.g., implemented by exchanging heartbeats), recovering from connection errors, or any suitable combination thereof.

In operation 950, the replication session manager 830 pulls data matching the data set of data distribution policies for which data replication sessions are maintained. Data may be transferred from multiple sources using multiple data replication sessions. The pulled data is stored locally, within the region 810. Requests for the pulled data are handled by providing the locally stored copy rather than sending a request to another region. As a result, the requests are handled more quickly.

The data distribution policies may cause replication of data objects without modification or include object transformations, include object projections, or any suitable combination thereof. For example, the filtering criteria may identify object fields for replication; other fields are not replicated, resulting in object projection during replication. As another example, a source region may store data in one file format (e.g., XML files) and a destination region may store data using another data format (e.g., a database file). Thus, transferring data from the source region to the destination region results in object transformations during replication.

Figure 10:
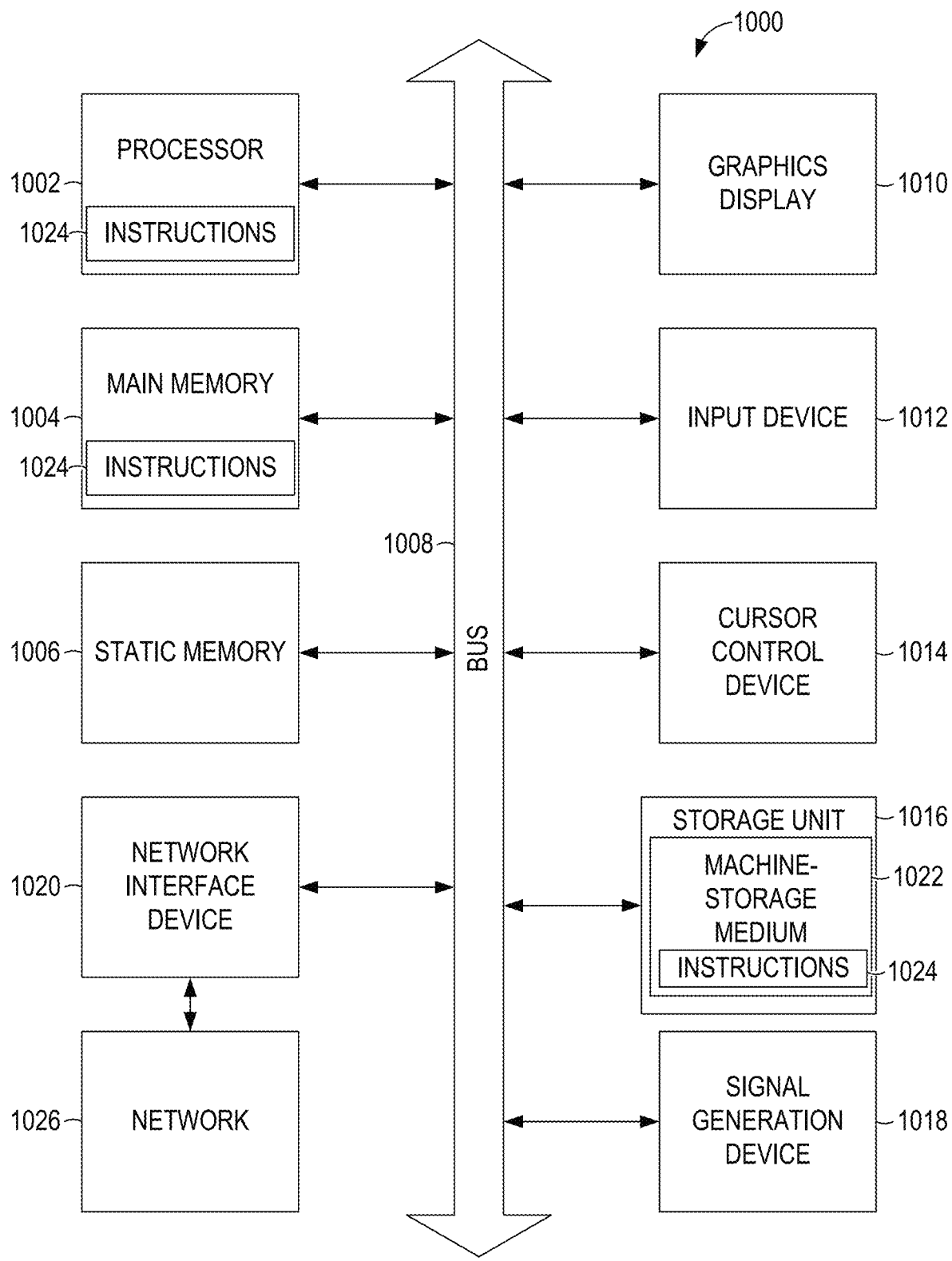
FIG. 10 is a block diagram illustrating components of a machine, according to some example embodiments, able to read instructions from a machine-storage medium and perform any one or more of the methodologies discussed herein.

FIG. 10 illustrates components of a machine 1000, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 10 shows a diagrammatic representation of the machine 1000 in the example form of a computer device (e.g., a computer) and within which instructions 1024 (e.g., software, a program, an application, an applet, an app, or other executable code) for causing the machine 1000 to perform any one or more of the methodologies discussed herein may be executed, in whole or in part.

For example, the instructions 1024 may cause the machine 1000 to execute the method 900 of FIG. 9. In one embodiment, the instructions 1024 can transform the general, non-programmed machine 1000 into a particular machine (e.g., specially configured machine) programmed to carry out the described and illustrated functions in the manner described.

In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a peer-to-peer (or distributed) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024 (sequentially or otherwise) that specify actions to be taken by that machine. Further, while only a single machine is illustrated, the term "machine" shall also be taken to include a collection of machines that individually or jointly execute the instructions 1024 to perform any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein.

The machine 1000 may further include a graphics display 1010 (e.g., a plasma display panel (PDP), a light emitting diode (LED) display, a liquid crystal display (LCD), a projector, or a cathode ray tube (CRT), or any other display capable of displaying graphics or video). The machine 1000 may also include an input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a sound card, an amplifier, a speaker, a headphone jack, or any suitable combination thereof), and a network interface device 1020.

The storage unit 1016 includes a machine-storage medium 1022 (e.g., a tangible machine-storage medium) on which is stored the instructions 1024 (e.g., software) embodying any one or more of the methodologies or functions described herein. The instructions 1024 may also reside, completely or at least partially, within the main memory 1004, within the processor 1002 (e.g., within the processor's cache memory), or both, before or during execution thereof by the machine 1000. Accordingly, the main memory 1004 and the processor 1002 may be considered as machine-storage media (e.g., tangible and non-transitory machine-storage media). The instructions 1024 may be transmitted or received over a communication network 1026 via the network interface device 1020.

In some example embodiments, the machine 1000 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (e.g., 1004, 1006, and/or memory of the processor(s) 1002) and/or storage unit 1016 may store one or more sets of instructions 1024 and data structures (e.g., software) embodying or utilized by any one or more of the methodologies or functions described herein. These instructions, when executed by processor(s) 1002 cause various operations to implement the disclosed embodiments.

As used herein, the terms "machine-storage medium," "device-storage medium," "computer-storage medium" (referred to collectively as "machine-storage medium 1022") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage medium 1022 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The machine-storage medium 1022 specifically excludes carrier waves, modulated data signals, and other such media, at least some of which are covered under the term "signal medium" discussed below. In this context, the machine-storage medium 1022 is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1024 may further be transmitted or received over a communication network 1026 using a transmission medium via the network interface device 1020 and utilizing any one of a number of well-known transfer protocols (e.g., HTTP). Examples of communication networks 1026 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 1024 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface [API]).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

In view of the disclosure above, various examples are set forth below. It should be noted that one or more features of an example, taken in isolation or combination, should be considered within the disclosure of this application.

EXAMPLES

Example 1 is a system for distributing data across cloud regions, comprising: a global policy manager that stores a data distribution policy that controls data distribution across a plurality of regions, the data distribution policy defining a data set and a topology for distributing the data set; a regional policy manager deployed in a region of the plurality of regions and performing operations comprising: receiving the data distribution policy from the global policy manager; and creating a data replication session based on whether the region of the regional policy manager is a destination region based on the topology of the received data distribution policy; and a session manager deployed in the region and performing operations comprising: maintaining the data replication session created in the region of the session manager; and pulling data matching the data set of the data replication session.

In Example 2, the subject matter of Example 1, wherein the data set of the data distribution policy comprises filtering criteria that comprises a data type and an object hierarchy scope.

In Example 3, the subject matter of Examples 1-2, wherein the data set of the data distribution policy comprises filtering criteria that comprises a data type and one or more object fields.

In Example 4, the subject matter of Examples 1-3, wherein the topology of the data distribution policy specifies origin regions and destination regions for distributing the data set of the data distribution policy.

In Example 5, the subject matter of Example 4, wherein the pulling of the data matching the data set of the data replication session comprises pulling the data from the origin regions specified in the topology of the data distribution policy.

In Example 6, the subject matter of Examples 1-5, wherein the session manager: maintains checkpoint information for replicated data; and resumes replication from a last checkpoint after a region failure.

In Example 7, the subject matter of Examples 1-6, wherein the session manager: maintains checkpoint information for replicated data; and resumes replication from a last checkpoint after a process restarts, upgrades, or fails.

In Example 8, the subject matter of Examples 1-7, wherein: the data distribution policy comprises a product-level policy that specifies tenant-aware distribution; and the creating of the data replication session based on whether the region of the regional policy manager is a destination region comprises determining whether the tenant is present in the region of the regional policy manager.

In Example 9, the subject matter of Examples 1-8, wherein the topology comprises a one-to-many topology where data is distributed from one origin region to multiple destination regions.

In Example 10, the subject matter of Examples 1-9, wherein the topology comprises a many-to-one topology where data is distributed from multiple origin regions to one destination region.

In Example 11, the subject matter of Examples 1-10, wherein the topology comprises a mesh topology where data is distributed from multiple origin regions to multiple destination regions.

Example 12 is a method comprising: storing, by a global policy manager implemented using one or more hardware processors, a data distribution policy that controls data distribution across a plurality of regions, the data distribution policy defining a data set and a topology for distributing the data set; receiving, by a regional policy manager deployed in a region of the plurality of regions, the data distribution policy from the global policy manager; creating, by the regional policy manager, a data replication session based on whether the region of the regional policy manager is a destination region based on the topology of the received data distribution policy; maintaining, by a session manager deployed in the region, the data replication session created in the region of the session manager; and pulling, by the session manager, data matching the data set of the data replication session.

In Example 13, the subject matter of Example 12, wherein the data set of the data distribution policy comprises filtering criteria that comprises a data type and an object hierarchy scope.

In Example 14, the subject matter of Examples 12-13, wherein the topology of the data distribution policy specifies origin regions and destination regions for distributing the data set of the data distribution policy.

In Example 15, the subject matter of Examples 12-14 includes maintaining, by the session manager, checkpoint information for replicated data; and resuming replication, by the session manager, from a last checkpoint after a region failure.

In Example 16, the subject matter of Examples 12-15, wherein: the data distribution policy comprises a product-level policy that specifies tenant-aware distribution; and the creating of the data replication session based on whether the region of the regional policy manager is a destination region comprises determining whether the tenant is present in the region of the regional policy manager.

In Example 17, the subject matter of Examples 12-16, wherein the topology comprises a one-to-many topology where data is distributed from one origin region to multiple destination regions.

Example 18 is at least one machine-storage medium comprising instructions that, when executed by one or more hardware processors of a one or more computers, cause the one or more computers to perform operations comprising: storing, by a global policy manager, a data distribution policy that controls data distribution across a plurality of regions, the data distribution policy defining a data set and a topology for distributing the data set; receiving, by a regional policy manager deployed in a region of the plurality of regions, the data distribution policy from the global policy manager; creating, by the regional policy manager, a data replication session based on whether the region of the regional policy manager is a destination region based on the topology of the received data distribution policy; maintaining, by a session manager deployed in the region, the data replication session created in the region of the session manager; and pulling, by the session manager, data matching the data set of the data replication session.

In Example 19, the subject matter of Example 18, wherein the data set of the data distribution policy comprises filtering criteria that comprises a data type and an object hierarchy scope.

In Example 20, the subject matter of Examples 18-19, wherein the topology of the data distribution policy specifies origin regions and destination regions for distributing the data set of the data distribution policy.

Example 21 is an apparatus comprising means to implement any of Examples 1-20.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A system for distributing data across cloud regions, comprising:
   a global policy manager that stores a data distribution policy that controls data distribution across a plurality of regions, the data distribution policy defining a data set and a topology for distributing the data set;
   a regional policy manager deployed in a region of the plurality of regions and performing operations comprising:
      receiving the data distribution policy from the global policy manager; and
      creating a data replication session based on whether the region of the regional policy manager is a destination region based on the topology of the received data distribution policy; and
   a session manager deployed in the region and performing operations comprising:
      maintaining the data replication session created in the region of the session manager; and
      pulling data matching the data set of the data replication session.

2. The system of claim 1, wherein the data set of the data distribution policy comprises filtering criteria that comprises a data type and an object hierarchy scope.

3. The system of claim 1, wherein the data set of the data distribution policy comprises filtering criteria that comprises a data type and one or more object fields.

4. The system of claim 1, wherein the topology of the data distribution policy specifies origin regions and destination regions for distributing the data set of the data distribution policy.

5. The system of claim 4, wherein the pulling of the data matching the data set of the data replication session comprises pulling the data from the origin regions specified in the topology of the data distribution policy.

6. The system of claim 1, wherein the session manager: maintains checkpoint information for replicated data; and resumes replication from a last checkpoint after a region failure.

7. The system of claim 1, wherein the session manager: maintains checkpoint information for replicated data; and resumes replication from a last checkpoint after a process restarts, upgrades, or fails.

8. The system of claim 1, wherein:
the data distribution policy comprises a product-level policy that specifies tenant-aware distribution; and
the creating of the data replication session based on whether the region of the regional policy manager is a destination region comprises determining whether the tenant is present in the region of the regional policy manager.

9. The system of claim 1, wherein the topology comprises a one-to-many topology where data is distributed from one origin region to multiple destination regions.

10. The system of claim 1, wherein the topology comprises a many-to-one topology where data is distributed from multiple origin regions to one destination region.

11. The system of claim 1, wherein the topology comprises a mesh topology where data is distributed from multiple origin regions to multiple destination regions.

12. A method comprising:
storing, by a global policy manager implemented using one or more hardware processors, a data distribution policy that controls data distribution across a plurality of regions, the data distribution policy defining a data set and a topology for distributing the data set;
receiving, by a regional policy manager deployed in a region of the plurality of regions, the data distribution policy from the global policy manager;
creating, by the regional policy manager, a data replication session based on whether the region of the regional policy manager is a destination region based on the topology of the received data distribution policy;
maintaining, by a session manager deployed in the region, the data replication session created in the region of the session manager; and
pulling, by the session manager, data matching the data set of the data replication session.

13. The method of claim 12, wherein the data set of the data distribution policy comprises filtering criteria that comprises a data type and an object hierarchy scope.

14. The method of claim 12, wherein the topology of the data distribution policy specifies origin regions and destination regions for distributing the data set of the data distribution policy.

15. The method of claim 12, further comprising:
maintaining, by the session manager, checkpoint information for replicated data; and
resuming replication, by the session manager, from a last checkpoint after a region failure.

16. The method of claim 12, wherein:
the data distribution policy comprises a product-level policy that specifies tenant-aware distribution; and
the creating of the data replication session based on whether the region of the regional policy manager is a destination region comprises determining whether the tenant is present in the region of the regional policy manager.

17. The method of claim 12, wherein the topology comprises a one-to-many topology where data is distributed from one origin region to multiple destination regions.

18. At least one machine-storage medium comprising instructions that, when executed by one or more hardware processors of a one or more computers, cause the one or more computers to perform operations comprising:
storing, by a global policy manager, a data distribution policy that controls data distribution across a plurality of regions, the data distribution policy defining a data set and a topology for distributing the data set;
receiving, by a regional policy manager deployed in a region of the plurality of regions, the data distribution policy from the global policy manager;
creating, by the regional policy manager, a data replication session based on whether the region of the regional policy manager is a destination region based on the topology of the received data distribution policy;
maintaining, by a session manager deployed in the region, the data replication session created in the region of the session manager; and
pulling, by the session manager, data matching the data set of the data replication session.

19. The at least one machine-storage medium of claim 18, wherein the data set of the data distribution policy comprises filtering criteria that comprises a data type and an object hierarchy scope.

20. The at least one machine-storage medium of claim 18, wherein the topology of the data distribution policy specifies origin regions and destination regions for distributing the data set of the data distribution policy.

* * * * *